C. E. RICHARDSON.
DENTAL FLOSS CARRIER.
APPLICATION FILED JUNE 28, 1916.

1,210,205.                            Patented Dec. 26, 1916.

Inventor
Chauncey E. Richardson
By
G. Ayres
Attorney

UNITED STATES PATENT OFFICE.

CHAUNCEY E. RICHARDSON, OF WASHINGTON, DISTRICT OF COLUMBIA.

DENTAL-FLOSS CARRIER.

1,210,205.  Specification of Letters Patent.  Patented Dec. 26, 1916.

Application filed June 28, 1916. Serial No. 106,449.

*To all whom it may concern:*

Be it known that I, CHAUNCEY E. RICHARDSON, a citizen of the United States, residing at Washington, in the District of Columbia, have invented certain new and useful Improvements in Dental-Floss Carriers, of which the following is a specification.

My invention relates to improvements in dental floss carriers, and it consists in the constructions, combinations and arrangements herein described and claimed.

An object of my invention is to provide a compact and attractive carrier, adapted to permit ready withdrawal of dental floss and to positively clamp the latter against accidental removal and waste.

A further object of my invention is to provide an improved carrier, adapted to facilitate convenient and efficient application of dental floss to the teeth.

Figure 1:
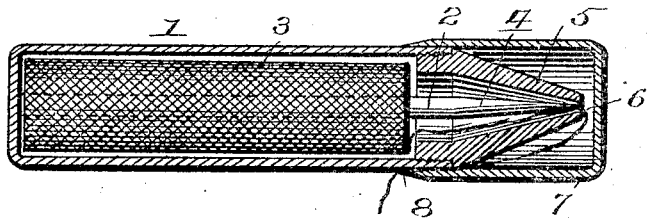
Figure 2:
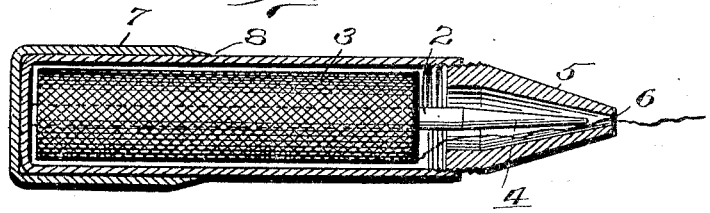
Figure 3:
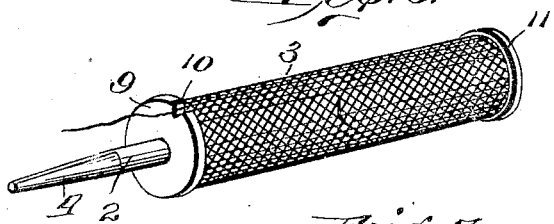
Figure 4:
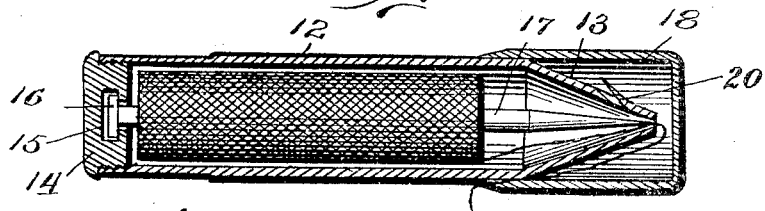
Figures 5, 6, 7:
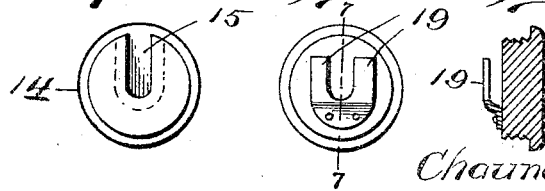

In the accompanying drawings: Figure 1 is a longitudinal, axial section, illustrating one embodiment of my invention with the dental floss positively clamped against withdrawal; Fig. 2 is a similar view, showing the tapered end partly unscrewed to permit withdrawal of the floss; Fig. 3 is a perspective view of the spindle and a reel or cop of dental floss thereon, showing a slight modification; Fig. 4 is a longitudinal, axial section, illustrating a modified construction; Fig. 5 is an inner view of the end screw closure shown in Fig. 4; Fig. 6 is an inner view of a modified form of screw closure, and Fig. 7 is a section of the line 7—7 of Fig. 6.

Referring to the drawings, 1 indicates a container provided with a spindle 2 for supply of dental floss 3; said spindle being shown with, but not necessarily provided with a truncated tapered end 4 adapted to be firmly clamped by a tapered end 5 provided at its apex with an aperture 6 for passage of the dental floss, and which can be screwed or otherwise suitably attached to the container 1.

I preferably provide cap shield 7, adapted to fit over the tapered end closure 5 for protecting the latter and the length of dental floss protruding therefrom; said cap 7 may be formed with a sharp edge 8, or other suitable means, for conveniently cutting off the lengths of dental floss.

Fig. 3 illustrates a slight modification, in which a disk 9 of paper, or other suitable material, is placed above the reel or cop 3 of dental floss on the spindle 2 and provided with a notch 10 to permit free passage of the dental floss thereby; said disk 9 acting to prevent snarling or tangling of the floss during withdrawal. If desired, a thin disk 11 may be placed on the spindle at the base of the dental floss cop 3.

Figs. 4 and 5 illustrates a modified construction, in which a container 12 is preferably formed with a tapered end 13 having an apertured apex for withdrawal of the dental floss and a cutting member 20 adjacent to said apex, and is provided with a screw closure 14 at its base; said closure 14 being provided with an undercut slot 15 for receiving a head 16 on the central spindle 17 of the container. The container 12 is shown with a slightly reduced exterior diameter adjacent to the screwed closure 14; thereby insuring a free turning of said screw closure by the cap shield 18 when the latter is slipped on the closure 14. This provides a construction in which the central spindle 17 is positively shifted by the screw closure 14 to clamp and release the dental floss passing through the tapered container end 13.

Figs. 6 and 7 illustrate a modified construction in which a yoke 19 of thin metal, or other suitable material, is attached to the screw closure for receiving the head 16 of the central spindle.

From the above description it will be clear that my invention provides an improved dental floss carrier, which is compact and attractive in appearance and adapted to permit convenient and efficient application of dental floss to the teeth.

I have illustrated and described preferred and satisfactory constructions, but changes could be made within the spirit and scope of my invention.

I claim:

1. A dental floss carrier comprising a container for dental floss having an interiorly tapered end provided with an apertured apex for passage of the floss, and internal movable means for interiorly clamping the floss in such aperture.

2. A dental floss carrier comprising a cylindrical container for dental floss having an interiorly tapered end provided with an apertured apex for the passage of the floss, internal movable means for interiorly clamping the floss in such aperture, and a removable cap adapted to fit over either end of the said container.

3. A dental floss carrier comprising a container, a spindle therein for a cop or reel of dental floss, an interiorly tapered end for said container provided with an apertured apex for passage of the floss, and movable means for relatively shifting said tapered end and spindle for interiorly clamping the latter and the floss in said apertured tapered end.

4. A dental floss carrier comprising a container, a spindle therein for a cop or reel of dental floss, an interiorly tapered end for said container provided with an apertured apex for passage of the floss, an internal movable means for positively shifting said spindle toward and into said tapered end to release the floss for withdrawal and to interiorly clamp the floss in said tapered end.

5. A dental floss carrier comprising a container for the floss and clamping means for the floss arranged wholly therein.

6. A dental floss carrier comprising a container for the floss, clamping means for the floss arranged wholly therein, and a cutting member formed on said container adjacent to the apertured apex thereof.

7. A dental floss carrier comprising a container adapted to hold the floss, provided with a discharge-opening for the floss, a cap fitting over the said opening-end of said container, the inner edge of which cap is sharpened and adapted to cut the floss that passes between said edge and said container.

8. A dental floss carrier comprising a spindle, a container provided with a threaded end, a screw-plug rotatably movable and threaded to engage said container so as to move the spindle with which said screw-plug is connected, in such manner as to engage the floss within said container.

9. A dental floss carrier comprising a screw-threaded plug, a container provided with a threaded end to engage said plug, a spindle attached to said plug, and said spindle movable to engage the floss against the inner wall of its container.

10. A dental floss carrier comprising a container adapted to hold floss provided with an aperture at one end and a movable closure at the opposite end, a spindle connected with and operable by said movable closure and adapted to engage the floss within said container.

In testimony whereof I affix my signature in presence of two witnesses.

CHAUNCEY E. RICHARDSON.

Witnesses:
FRED C. RHOADS,
MONTE W. SOHN.

Copies of this patent may be obtained for five cents each, by addressing the "Commissioner of Patents, Washington, D. C."